United States Patent [19]

Friedmann

[11] 4,378,869
[45] Apr. 5, 1983

[54] CLUTCH DISC

[75] Inventor: Oswald Friedmann, Buhl, Fed. Rep. of Germany

[73] Assignee: LuK Lamellen und Kupplungsbau GmbH, Buhl, Fed. Rep. of Germany

[21] Appl. No.: 113,305

[22] Filed: Jan. 18, 1980

[30] Foreign Application Priority Data

Jan. 20, 1979 [DE] Fed. Rep. of Germany ....... 2902188

[51] Int. Cl.³ .............................................. F16D 3/14
[52] U.S. Cl. .................................................. 192/106.2
[58] Field of Search .......................... 192/106.2, 106.1; 64/27 C, 27 L, 27 S

[56] References Cited

U.S. PATENT DOCUMENTS

| | | | |
|---|---|---|---|
| 2,291,405 | 7/1942 | Nutt ................................... | 192/106.2 |
| 3,578,121 | 5/1971 | Maurice ............................ | 192/106.2 |
| 3,938,635 | 2/1976 | Davies et al. ..................... | 192/106.2 |
| 3,995,726 | 12/1976 | De Gennes ....................... | 192/106.2 |
| 4,018,320 | 4/1977 | Schrape et al. .................. | 192/106.2 |
| 4,036,341 | 7/1977 | Beeskow et al. ................. | 192/106.2 |
| 4,044,873 | 8/1977 | Parsons et al. ................... | 192/106.2 |
| 4,121,706 | 10/1978 | Zapf ................................... | 192/106.2 |
| 4,223,776 | 9/1980 | Berlioux .......................... | 192/106.2 |

Primary Examiner—George H. Krizmanich
Attorney, Agent, or Firm—Kontler, Grimes & Battersby

[57] ABSTRACT

A clutch disc, especially for use in friction clutches of motor vehicles, has two subassemblies one of which is held against rotation with respect to the hub and the other of which is held against rotation with respect to the friction linings. The limited angular movement between the two subassemblies is opposed, at least in part, by energy accumulators and friction. An element participating in the generation of friction is a washer-like part which is under the action of axial spring force and is pushed, on the one hand, against a part of the one subassembly and, on the other hand, has a form fit effective against angular movement with a part of the other subassembly. The form-fitting connection is established by engagement of at least one contour which changes in the axial direction in wedge- or cone-fashion and is provided at least on one part forming the form-fitting connection with at least one countercontour provided on at least one other part forming the connection.

14 Claims, 13 Drawing Figures

CLUTCH DISC

BACKGROUND OF THE INVENTION

The invention relates to a clutch disc, especially for motor vehicles, wherein at least two subassemblies, of which one cannot rotate with respect to a hub and the other cannot rotate with respect to friction linings, can perform a limited amount of angular movement with respect to each other and wherein such angular movement is influenced, at least during certain stages thereof, by energy accumulators and friction. An element which participates in the generation of friction is a washer-like part which is under the action of an axial spring force and is pushed, on the one hand, against a part of the one subassembly and, on the other hand, is form-fittingly secured to one of the parts of the other subassembly.

Such clutch discs have become known, for instance, through German Utility Model No. 7 817 912. There, the following parts are arranged about the hub body, as considered in the axial direction and in the order listed:
- an annular washer-like part which is held against movement relative to the hub body in the axial as well as in the circumferential direction,
- a cup spring,
- a further annular washer-like part which cannot move in the circumferential direction but is displaceable in the axial direction,
- a friction or slide lining,
- a lining support disc with the friction linings,
- a further friction or slide lining,
- the hub flange,
- the counter disc.

The friction can be controlled by the cup spring which bears on the one side against the one and on the other side against the further washer-like part. The further washer-like part is held against rotation with respect to the hub, in that the one washer-like part is formed with arms which extend in the axial direction and into recesses of the further washer-like part. When the friction or slide linings which perform a damping action during relative angular movement wear away, the cup spring can readjust the further washer-like part and the friction or slide linings as well as the lining support disc in the axial direction toward the hub flange.

A certain amount of play is necessary in order to ensure that, during assembly of the clutch disc, the axially extending arms can be inserted into the recesses of the further washer-like part. However, such play increases during operation due to wear upon the arms and surfaces surrounding the recesses, primarily as a result of load changes occurring during operation, especially when idling.

The play between the washer-like parts causes a reduction of friction torque in load-change operation between pulling and pushing. This is noticeable in turn by an annoying, distinctly audible noise.

OBJECTS AND SUMMARY OF THE INVENTION

It is an object of the present invention to eliminate the disadvantages of the aforediscussed conventional clutch discs and to obtain the full friction torque, i.e., the full hysteresis of the friction effect during load changes, also when the friction linings wear out.

According to the invention, this is accomplished by eliminating the play between the washer-like or ring-shaped part which is sprung in the axial direction and the part of that subassembly to which the ring-shaped part is non-rotatably secured. In connection with clutch discs of the type mentioned at the outset, this is achieved in that the form-fitting connection is established as a result of engagement of a contour which changes in the axial direction in wedge- or cone-fashion and is provided on at least one part forming this form-fitting connection, with at least one countercontour provided on at least one other part of the connection.

For this purpose the ring-shaped part can be provided with at least one arm which extends in the axial direction and engages the countercontour of the part of the one subassembly so as to be held against rotation, and by which the engagement which is subjected to the wedge- or cone-action in the axial direction is established.

The arm pointing in the axial direction can have the form of a strip and can engage with a wedge- or cone-like countercontour of the corresponding part; it may itself be conical or only the arm of the ring-shaped part may be wedge- or cone-shaped, with which this part engages in or on a corresponding countercontour of the other part or makes contact therewith. The wedge- or cone-shaped section can be formed, however, also by a fork- or tine-shaped design of the arm or arms, a tapering wedge-like section being disposed between two adjacent tines between which the countercontours of the other part are braced under spring tension.

However, the wedge- or cone-shaped contour may also be provided on that part of the one subassembly with which the ring-shaped part is subjected to the wedge- or cone-action in the axial direction.

This conical contour can be formed, as described above, by a wedge- or cone-shaped arm or section, or arms or sections, pointing in the axial direction.

However, the axially extending wedge- or cone-like contour can also constitute an extension which is formed on one of the parts by material displacement and points in the axial direction to project into a recess, such as a slot, a hole or the like, in the other part.

It may be advantageous if the washer-like or ring-shaped part, which is in form-fitting engagement with a structural part as a result of a wedge- or cone-action in the axial direction, is itself resilient in the axial direction such as, in particular, a cup spring. It may be of advantage in this connection if the non-rotatable form-fitting connection of the washer-shaped spring element, which is subjected to wedge- or cone-action in the axial direction, is established with the hub and if the washer-shaped spring element is braced on the other side directly against the lining support disc. Such metal-to-metal friction eliminates all play, even if the spring element and/or the lining support disc should change its axial position as a result of wear.

In this connection, it is particularly advantageous if the arms which establish the form-fitting connection as a result of wedge- or cone-action in the axial direction are formed on the radially innermost portion of the washer-shaped spring element since, in that case, less material is required than if the arms were provided on the radially outermost portion of the spring element.

In accordance with another embodiment, still to be explained in detail, it may be particularly advantageous if the washer-like spring element has a first connection which is subjected to a wedge- or cone-action in the axial direction, with the one part of the one subassembly against which it is braced and a second connection, likewise subjected to a wedge- or cone-action, with the one washer-like part.

In such an embodiment, the outermost and the innermost portions of the washer-shaped spring element can have axially extending wedge-shaped arms which point in opposite directions. The tapered portions of the arms point away from the washer-like base member.

In accordance with another embodiment, the outer- and the inner-diameter portions of the washer-shaped spring element have countercontours in the form of radial arms or recesses. Axially extending first countercontours of the further washer-like part engage one portion of the spring element, preferably the outer-diameter portion, while second wedge-shaped countercontours pointing in the axial direction engage a portion of the spring element, preferably the inner-diameter portion, and are fastened to a part of the one subassembly, for instance, to the hub.

In the embodiment wherein the washer-shaped spring element has arms, a practical construction of the clutch disc is obtained if the following parts are provided about the hub body in the axial direction and in the order listed:
  the lining support of the counter-disc,
  the washer-like spring element,
  the further washer-like part,
  a friction or slide lining,
  the hub flange, and
  the counter- or the lining support disc,
where between the lining support or the counter disc and the washer-shaped spring element, on the one hand, and the latter and the further washer-like part, on the other hand, a form-fitting connection subjected to resiliently tensioned wedge or cone engagement is formed.

The other clutch disc mentioned above can be constructed particularly advantageously in such a manner that the following parts are provided about the hub body as seen in the axial direction and in the order listed:
  a ring member which is firmly connected to the hub body, for instance, pressed in or on,
  the washer-like spring element,
  the further washer-like part,
  a friction or slide lining,
  the drive or the counter disc,
  optionally a further friction or slide lining,
  the hub flange, and
  the counter or drive disc,
and where between the ring member and the washer-like spring element on the one hand and the latter and the further washer-like part on the other hand, a form-fitting connection subjected to a resiliently tensioned wedge or cone engagement is formed.

It is evident that, owing to the provision of the wedge or cone fit, play between the corresponding parts is prevented also if the ring-shaped spring element or the further washer-shaped part changes its axial position due to wear at the friction or slide linings.

The invention will be explained in further detail with references to FIGS. 1 to 13.

DESCRIPTION OF THE PREFERRED EMBODIMENTS

Figure 1:
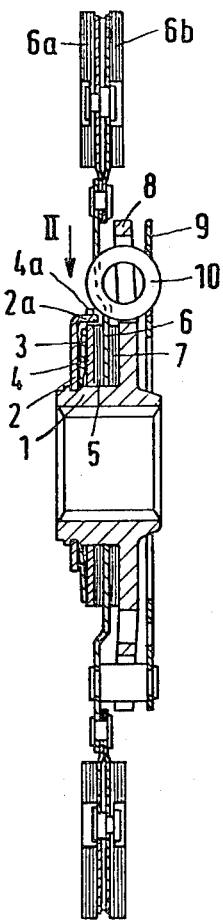
FIG. 1 shows the construction of a conventional clutch disc, partially in cross section.

In FIG. 1, the following parts are mounted on a hub 1, as considered in the axial direction and in the order listed, starting from the left:
  a disc-like part which is firmly secured to the hub 1, for instance, by swaging;
  a cup or diaphragm spring 3;
  a further disc-like part 4;
  a friction lining 5;
  a lining support or drive disc 6 with two friction linings 6a, 6b;
  a further friction lining 7;
  a hub flange 8; and
  a counter disc 9.

The disc-shaped part 2 has an arm 2a extending into a slot-like recess 4a in the disc-like part 4, whereby the latter is held against angular movement with respect to the part 2. In the event of wear at the friction linings 5, 7, the cup spring 3 can perform the necessary adjustment in the axial direction.

The drive and counter discs 6 and 9 are non-rotatably connected to each other in a manner known per se and can rotate relative to the hub 1 and flange 8 against the opposition of energy accumulators in the form of springs 10. The angular play is further subject to friction which is generated by the cup spring 3 and by the friction linings 5 and 7.

Figure 3:
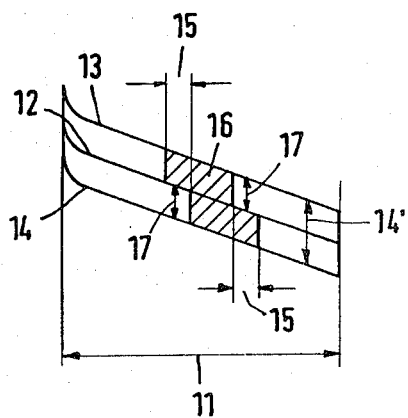
FIG. 3 shows one branch of a possible characteristic of such a clutch disc, the twist angle being plotted along the abscissa and the torque along the ordinate.

This is shown more clearly in FIG. 3. The range 11 designates the extent of angular displacement of a first subassembly including the parts 6, 6a, 6b and 9 relative to a second subassembly including the parts 1, 2, 3, 4 and 8 in one direction of rotation. The line 12 denotes the spring characteristic, the lines 13 and 14 denote the friction superimposed on the spring characteristic, and the range 14' denotes the hysteresis.

Figure 2:
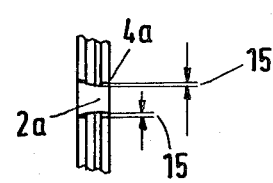
FIG. 2 is a view as seen in the direction of arrow II in FIG. 1.

To ensure that the parts 2 and 4 can be assembled, it is necessary to provide a certain amount of play 15 between the arm 2a and the surface surrounding the recess 4a, as shown in detail in FIG. 2.

Upon every load change, i.e., for every reversal of the direction of rotation, the part 4 turns relative to the part 2 to the extent determined by the play between the arm 2a and the surface surrounding the recess 4a, since friction between the cup spring 3 and the part 4 is less pronounced than that between the part 4 and the friction lining 5.

FIG. 3 shows a performance characteristic 16 of such a load change. It will be seen that, within the entire play 15, a reduced friction torque 17 is generated so that the damping effect is reduced considerably and the well-known disadvantages occur. Further reduction of the damping effect is caused by the wear or if the arm 2a works its way into the part 4.

Figure 4:
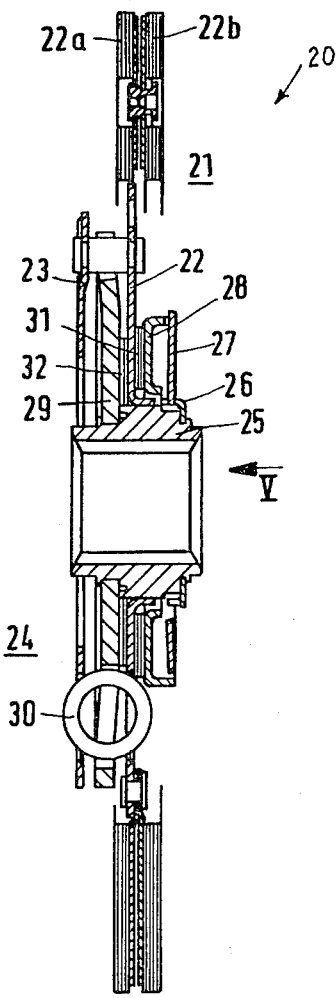
FIG. 4 is an axial sectional view of a clutch disc which embodies one form of the invention.

In the clutch disc 20 of FIG. 4, a first subassembly 21 consisting of a lining support disc 22 with two friction linings 22a and 22b and a counter disc 23 non-rotatably connected to the lining support disc 22 is rotatable relative to a second subassembly 24 which consists of a hub 25, a support 26 secured thereto against movement in the circumferential direction and in the axial direction, a ring-shaped resilient part 27, a washer-shaped part 28 and a hub flange 29. The limited angular movement of the two subassemblies 21 and 24 relative to each other is subjected to the action of energy accumulators in the form of springs 30 and is futhermore subjected to friction which is generated by the resilient part 27 and the friction or damper linings 31, 32.

Figure 8:
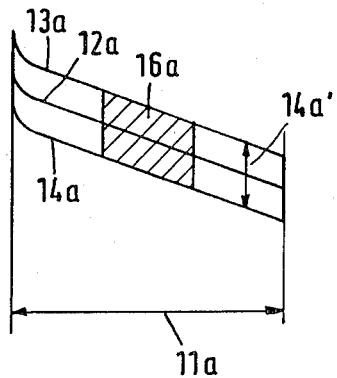
FIG. 8 is a possible characteristic of the clutch disc shown in FIG. 4.

In FIG. 8, the possible characteristic is again shown in one direction of rotation through an angle 11a, the spring characteristic 12a, the characteristics 13a, 14a of the superimposed friction and the hysteresis 14a'.

Figure 5:
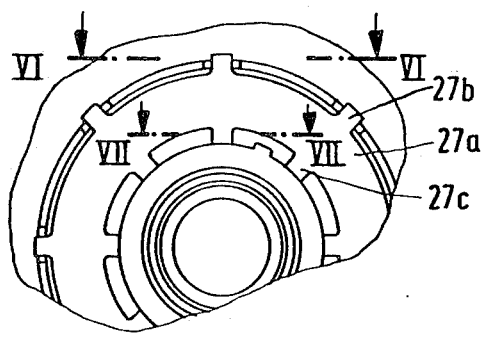
FIG. 5 is a fragmentary end elevational view as seen in the direction of arrow V in FIG. 4.
Figure 6:
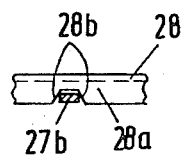
FIG. 6 is a sectional view as seen in the direction of arrows from the line VI—VI of FIG. 5.
Figure 7:
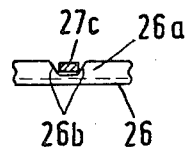
FIG. 7 is a sectional view as seen in the direction of arrows from the line VII—VII of FIG. 5.

In order to prevent play and therewith loss of friction within this play according to the play 15 in the clutch disc of FIG. 1, a non-rotatable connection is established in the clutch disc of FIG. 4 between the hub 25, the ring-shaped resilient part 27 and the washer-shaped part 28 by a tapered wedge or cone connection, as will be explained in greater detail in connection with FIGS. 5 to 7.

The ring-shaped resilient part 27, such as a cup or diaphragm spring, consists of a base 27a with radially outwardly extending arms 27b and radially inwardly extending arms 27c.

The support part 26 has arms 26a which extend in the axial direction, while the washer-shaped part 28 has arms 28a which extend axially in the opposite direction. The arms 28a and 26a respectively have formed-on contours 28b and 26b which extend in the axial direction and against which the arms 27b, 27c rest under the bias of the cup spring 27. This wedge-like connection which is subjected to an axial spring force ensures that play, such as was unavoidable in conventional clutch discs, cannot develop even if wear should occur at the damper linings 31, 32, and axial displacement of the lining support disc 22, of the washer-shaped part 28 and of the cup spring 27; a change in the axial position of the latter would be noticed by an inclination.

Consequently, the full performance characteristic according to the area 16a of the hysteresis effect (see FIG. 8) is always available in the event of load changes.

Figure 9:
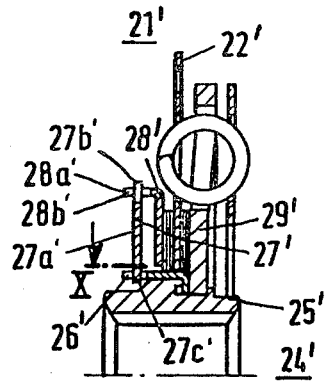
FIG. 9 is a fragmentary axial sectional view of a second embodiment of the improved clutch disc.
Figure 10:
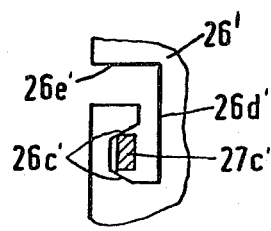
FIG. 10 is a fragmentary axial sectional view as seen in the direction of arrow from the line X in FIG. 9.

A further embodiment of a clutch disc according to the invention is shown in FIGS. 9 and 10.

In the latter Figures, only the lining support disc 22' of the subassembly 21' is actually shown. Of the other subassembly 24', the hub 25', a support part 26', a ring-shaped resilient part 27' and a washer-shaped part 28' as well as the flange 29' can be seen in FIG. 9. The resilient part 27' has a ring-shaped base 27a' and radially outwardly as well as radially inwardly extending arms 27b' and 27c'. The part 28' can have, like the part 28 of FIG. 4, arms 28a' with wedge-shaped contours 28b' into which the resilient part 27' extends with its arms 27b'. The bracing for the arms 27c' can be seen in FIG. 10. There, a cutout 26d' for each of the arms 27c' is provided in the support part 26' where a wedge section 26c' extending in the axial direction is provided behind, as seen in the circumferential direction, a lead-in cutout section 26e' for inserting the arms 27c' in the axial direction.

Figure 11:
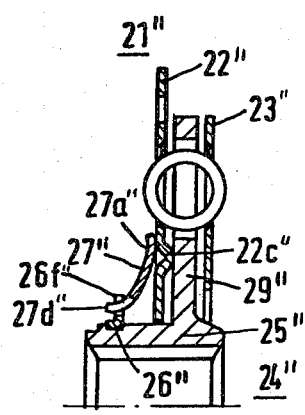
FIG. 11 is a fragmentary axial sectional view of a third clutch clutch disc embodying the invention.

FIG. 11 shows another embodiment of the invention, namely, a clutch disc which is shown in cross section. Of the one subassembly 21", only the partially drawn lining support disc 22" and the counter disc 23" are shown. Of the subassembly 24", the hub 25" and the hub flange 29" as well as the ring-shaped resilient part in the form of a cup or diaphragm spring 27" are shown, as well as the support part 26" for the cup spring 27", fastened to the hub 25". The support part 26" has slot-like recesses 26f" for wedge-shaped axially extending extensions or arms 27d" of the cup spring base 27a" to thus form a form-locking connection without play. The cup spring 27" which bears against the support part 26" on the one hand and against the lining support disc 22" on the other hand, pushes the lining support disc with a formed-on circular bead 22c" against the hub flange 29". Steel-on-steel friction takes place here. In the event of wear between the parts 27a" and 22", and 22" and 29", respectively, a readjustment is brought about by the force of the cup spring 27", whereby the cup spring occupies a different position; the wedge action nevertheless prevents any circumferential play or rattling motion between the parts 26", 27" and 22".

Figure 12:
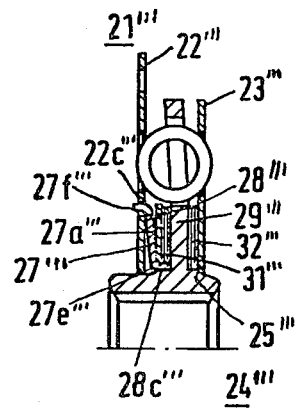
FIG. 12 is a similar fragmentary axial sectional view of a fourth disc.

In FIG. 12 which likewise depicts a clutch disc shown in a fragmentary cross-sectional view, the subassembly 21''' comprises a lining support disc 22''', a counter disc 23''' which is non-rotatably connected thereto, a ring-shaped resilient part 27''' as well as a washer-shaped part 28'''.

Of the subassembly 24''', the hub 25''' and the hub flange 29''' are visible. Further provided are the two friction or damper linings 31''' and 32''', in this case at both sides of the hub flange 29'''. The cup spring 27''' tensions the subassembly 21''' relative to the subassembly 24''' in the axial direction and, at the same time, the friction linings 31''' and 32''' between these subassemblies are tensioned in the axial direction.

That the part 28''' with the lining support disc 22''' is entrained without relative angular movement and without play is ensured by the provision that the arms 27e''' and 27f''', which are formed on the cup spring base 27a''' and point in opposite axial directions, are wedge-shaped and are resiliently braced or engaged in recesses 22c''' of the lining support disc 22''' and in the recesses 28c''' in the washer-like part 28'''.

Figure 13:
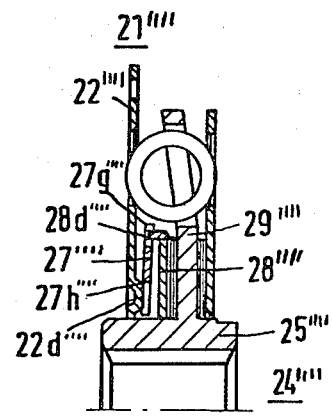
FIG. 13 is a similar fragmentary axial sectional view of a fifth clutch disc.

In FIG. 13, in which the parts 25'''' and 29'''', i.e., the hub and the hub flange, of the subassembly 24'''' and the lining support 22'''', the cup spring 27'''' and the washer-shaped part 28'''' of the subassembly 21'''' are visible, the wedge-like connection between the washer part 28'''' and the cup spring 27'''' is formed by an arm 28d'''' and a recess 27g''''. The recess 27g'''' is made wedge-shaped here, however, and more specifically, with its width increasing in the direction toward the disc part 28'''', while the arm 28d'''' is made with parallel contours, so that wedge-like contours which are provided here at the cup spring and change in the axial direction rest resiliently against the arm 28d''''.

The form-locking connection between the cup spring 27'''' and the disc 22'''' is established by the engagement of a bump-like conical embossing 22d'''' formed by material displacement with a recess 27h'''' of the cup spring 27''''.

The recess 27h'''' could also be made additionally wedge- or cone-shaped, as also the arm 28d'''' could be made wedge- or cone-shaped. Furthermore, a reversal of the arrangement of the cone-like contours at the various parts in all figures would be possible.

The non-rotary form-locking connection without play can be formed, however, also by profiles other than wedge-shape, for instance, by U-, V-, half-round or elliptic profiles or others which become narrower in the axial direction.

I claim:

1. A clutch disc, especially for use in friction clutches of motor vehicles, comprising a first subassembly including a rotary hub; a second subassembly coaxial with said first subassembly, including at least one friction lining and being rotatable within limits relative to said first assembly; energy accumulator means interposed between and arranged to oppose at least some of the limited angular movement of said subassemblies relative to each other; and friction generating means interposed between said subassemblies and including a substantially washer-like axially stressed part which reacts against one of said subassemblies and establishes a form fitting connection with the other of said subassemblies, said other subassembly including at least one additional part which establishes said connection with said washer-like part, one of said parts including at least one contour which tapers in the axial direction of said subassemblies and the other of said parts having a countercontour in engagement with said contour to hold such parts against angular movement with reference to one another.

2. The clutch disc of claim 1, wherein said one part has at least one axially extending arm which defines said contour and said countercontour cooperates with said contour to establish a substantially wedge-like interlocking action between said parts.

3. The clutch disc of claim 2, wherein said arm is provided on said washer-like part.

4. The clutch disc of claim 2, wherein said one part is an element of said second subassembly.

5. The clutch disc of claim 2, wherein said arm is a protrusion which is formed by displacement of the material of said one part and said other part has a recess which is bounded by said countercontour.

6. The clutch disc of claim 1, wherein one of said parts is resilient.

7. The clutch disc of claim 6, wherein said resilient part is a cup spring.

8. The clutch disc of claim 6, wherein said resilient part constitutes an element of said first subassembly so that it is held against rotation relative to said hub, said second subassembly further comprising a support disc for said lining and said resilient part bearing directly against said support disc.

9. The clutch disc of claim 1, wherein said one part is resilient and constitutes said washer-like part, said washer-like part having an inner portion, as considered in the radial direction of said subassemblies, which includes at least one arm defining said contour.

10. The clutch disc of claim 1, wherein said one part is resilient and constitutes and washer-like part, the subassembly including said additional part further including a third part which establishes a second form fitting connection with said resilient part, one of the parts including said resilient part and said third part having at least one second contour which tapers in the axial direction of said subassemblies and the other of the parts including said resilient part and said third part having at least one second countercontour complementary to and engaging with said second contour to hold said resilient part and said third part against angular movement relative to one another.

11. The clutch disc of claim 1, wherein said one part is resilient and constitutes said washer-like part, said resilient part having inner and outer portions, as considered in the radial direction of said subassemblies, said outer portion having at least one substantially axially extending first arm defining said contour and said inner portion having at least one substantially axially extending second arm defining a second contour, the subassembly which includes said additional part further including a third part defining a second countercontour cooperating with said second contour to hold said resilient part and said third part against angular movement relative to one another.

12. The clutch disc of claim 1, wherein said one part is resilient and constitutes said washer-like part, said washer-like part having inner and outer portions, as considered in the radial direction of said subassemblies, respectively including at least one substantially radially extending first arm and at least one substantially radially extending second arm, said first arm defining said contour and said additional part having at least one substantially axially extending third arm defining said countercontour, the subassembly which includes said additional part further including a third part having at least one substantially axially extending fourth arm defining a second countercontour cooperating with said second contour to hold said washer-like part and said third part against angular movement relative to one another.

13. The clutch disc of claim 1, wherein said second subassembly further includes a first disc constituting a support for said lining and a second disc spaced apart from and rigid with said first disc, said first subassembly further including a flange rigid with and extending radially outwardly from said hub and disposed between said discs, said friction generating means further including two slide linings flanking said flange and said parts being disposed between one of said slide linings and one of said discs, and further comprising a second form fitting connection provided between said one part and said one disc.

14. The clutch disc of claim 1, wherein said second subassembly further includes a first disc constituting a support for said lining and a second disc spaced apart from and rigid with said first disc, said hub having a radially outwardly extending flange disposed between said discs and said friction generating means further comprising two slide linings flanking one of said discs, said first subassembly further including an annular element rigid with and extending radially outwardly from said hub, said parts being disposed between said annular element and said one disc, said one part and said annular element defining a second form fitting connection which holds said one part against angular movement relative to said hub.

* * * * *